Sept. 24, 1929.  E. C. SMITH  1,729,090
DRIVE MECHANISM FOR SPREADERS
Filed Nov. 14, 1927  2 Sheets-Sheet 1
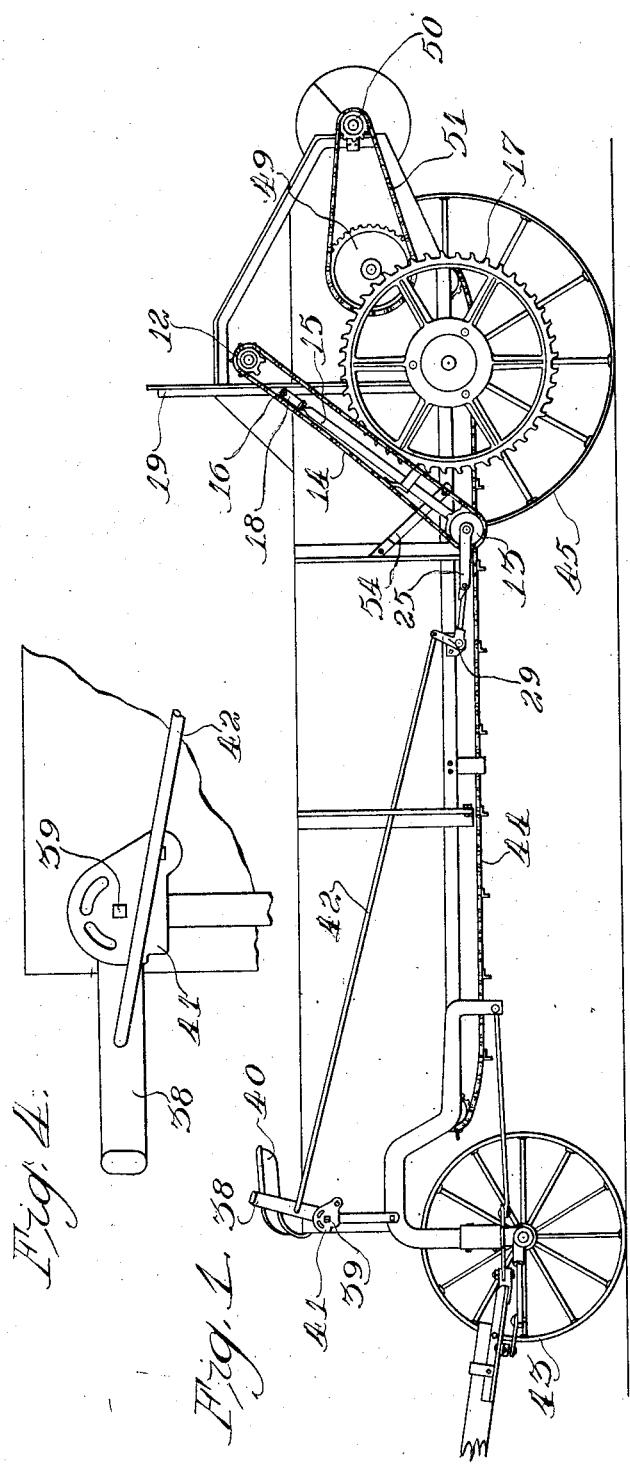
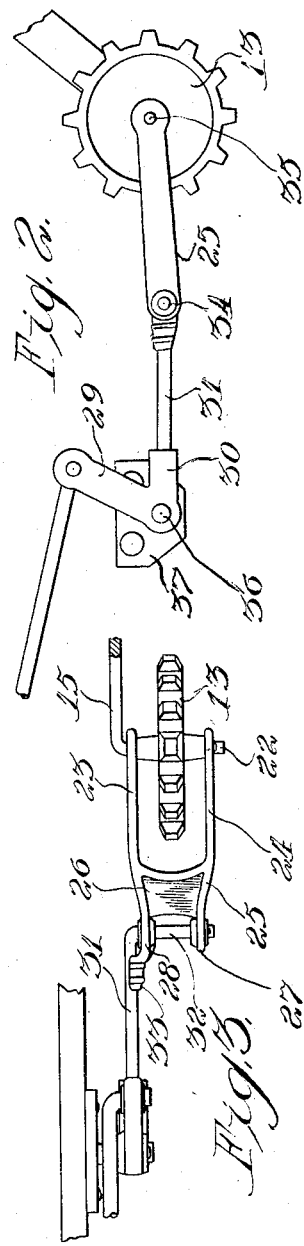
Inventor
Ernest C. Smith.
By
Atty.

Sept. 24, 1929.  E. C. SMITH  1,729,090
DRIVE MECHANISM FOR SPREADERS
Filed Nov. 14, 1927  2 Sheets-Sheet 2
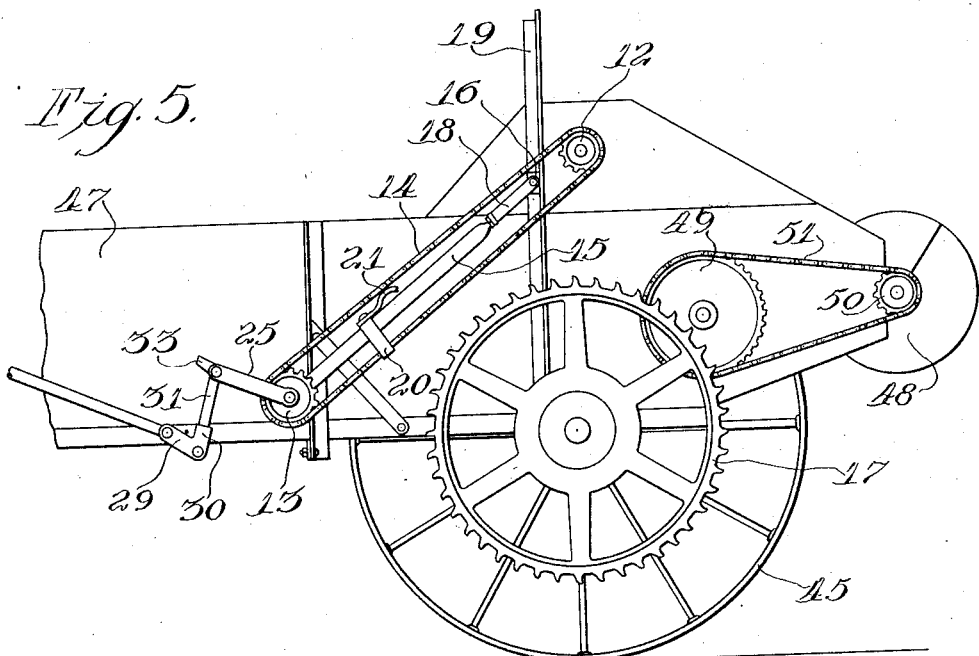
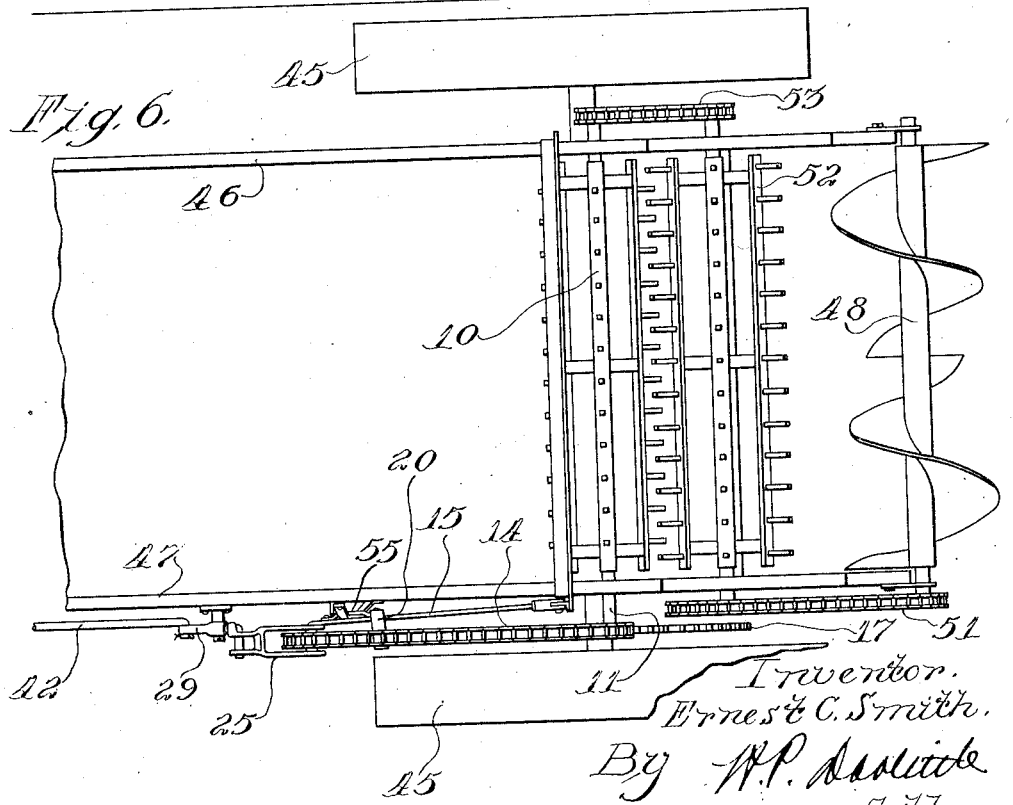

Patented Sept. 24, 1929

1,729,090

UNITED STATES PATENT OFFICE

ERNEST C. SMITH, OF CHICAGO, ILLINOIS, ASSIGNOR TO INTERNATIONAL HARVESTER COMPANY, A CORPORATION OF NEW JERSEY

DRIVE-MECHANISM FOR SPREADERS

Application filed November 14, 1927. Serial No. 232,997.

This invention relates to beater driving mechanisms for manure spreaders, and more particularly to a control mechanism for such devices.

An object of the invention is to present a practical and successful manure spreader of rugged construction and having a novel mode of operation of its parts.

More particularly, an object of the invention is to provide a new beater driving mechanism including a sprocket gearing having a driven chain controllable by novel devices which tighten the chain as it is moved to inoperative position away from the sprocket wheel which drives it.

Another object of the invention is to provide a novel mechanism for controlling the movements of the driven sprocket chain to and from its operative position and for locking it in its operative position by means of a toggle mechanism which is gravity actuated toward locking position and which is held in its released position by means of a dead center lock lever operating without detent mechanism to control the toggle mechanism and the sprocket chain of the beater driving mechanism.

Other objects of the invention will appear as the accompanying description proceeds.

An illustrative embodiment of the invention is shown in the accompanying drawings, in which,—

Figure 1 is a side elevation of a manure spreader equipped with the beater driving mechanism;

Figure 2 is a detail view in side elevation of the gravity actuated toggle mechanism which locks the idler sprocket and the driven sprocket chain in their operative positions;

Figure 3 is a plan of the parts shown in Figure 2;

Figure 4 is a side elevation of the dead center lock lever which operates without detent mechanism to control the movements of the beater drive into and out of operation;

Figure 5 is a side elevation illustrating the manner in which the driven sprocket chain is tightened when it is moved toward its inoperative position; and Figure 6 is a plan of a part of the manure spreader showing the arrangement of the parts of the beater driving mechanism.

Referring to the drawings, the beater 10 is fixed upon a shaft 11, non-rotatively carrying a driven sprocket 12. Trained around this sprocket and the idler sprocket 13 is a driven sprocket chain 14 which imparts rotation to the beater. This chain, through the agency of the idler sprocket, is carried by a movable support herein shown as the radius bar or strut 15. This strut is pivotally mounted at its upper end upon the body of the spreader at 16. Referring to Figure 1 of the drawings, it will be seen that the axis of the pivotal connection at 16 lies to the left of a line connecting the axes of the sprockets 12 and 13. This arrangement of elements causes the sprocket chain 14 to be tightened as it is moved to its upper or inoperative position away from a driving sprocket 17, for the purpose of preventing accidental engagement of the sprocket chain with the driving sprocket and for promoting long life of the mechanism because of the fact that only a part of the chain is constantly under maximum tension when the spreader is in operation.

The strut 15 is herein shown as adjustably mounted relative to the axis of the pivotal connection at 16 by means of a screw-threaded portion of the strut, which is received within a threaded sleeve 18. It is this sleeve which is pivoted at 16 to the upright 19 of the spreader body. At its lower end the strut 15 is preferably bent at right angles and formed so as to provide a rotative support for the idler sprocket 13. Intermediate its ends the strut is shown provided with a sprocket chain guide 20 and a member 21 for directing the upper run of the sprocket chain 14.

A bent portion 22 of the strut 15 passes through openings in the prongs 23 and 24 of a fork or link 25, herein shown as a part of a toggle mechanism which is gravity actuated toward its locking position. Besides rotatively mounting the idler sprocket 13, the bent portion of the strut 15 is also pivotally related to the link 25 by reason of its loose mounting within the prongs 23 and 24. As shown, the link 25 has an intermediate or web structure 26 from the side of which opposite the prongs 23 and 24 there extend journal arms 27 and 28. These arms are bored to receive a part of a bell crank lever which cooperates with the link 25 to lock the beater drive mechanism in operative position and to move the sprocket chain to its inoperative position. This bell crank lever is shown having arms 29 and 30, the latter of which carries the rod 31, which is bent at right angles, as shown at 32, so as to be journaled within the arms 27 and 28. An arcuate stop 33 fits against the side of and top of the longitudinal portion of the rod 31 to prevent the link 25 and the rod 31 from moving past their toggle locking position which are indicated in Figure 2 of the drawings. This stop is shown as an extension of the arm 28, and it will be noted that it maintains the parts 25 and 31 in such a position that the axis 34 of the pivotal connection between those parts is slightly below a line joining the axis of rotation 35 of the idler sprocket 13 and the axis 36 of the pivotal connection between the bell crank arms 29 and 30 and a fixed support 37. This arrangement of the parts of the toggle-locking mechanism prevents the pressure of the driving sprocket upon the sprocket chain 14 from moving the strut and the chain forwardly out of contact with the driving sprocket.

In order to provide a mechanism whereby the operator may, by a single flip of his hand, cause the beater driving mechanism to be automatically shifted and locked in operative position, a dead center lock lever 38 is provided. This lever is shown as pivotally mounted at 39 at a position near the forward end of the spreader adjacent the operator's seat 40. A guide and stop device 41 guides the lever from its forward position shown in Figure 4 to its rearward position indicated in Figure 1. This device also presents a stop which prevents the weight of the beater driving mechanism and the toggle mechanism from moving the lever backwardly and downwardly from its position indicated in Figure 4. The bell crank arm 29 and the lever 38 are so connected by a link 42 that when the lever is in the position shown in Figure 4, the axis 39 of the lever is above the link. When the parts are in this position the driving sprocket chain 14 is locked in its inoperative position with the chain in tightened condition. It requires but slight pressure upward upon the lever 38 to release this dead center lock and allow the parts of the toggle lock to descend under the influence of gravity to their locking position indicated in Figures 1 and 2 of the drawings.

Among the parts not above described are the front truck 43, the apron 44, the rear wheels 45, the body walls 46 and 47, and the wide spread attachment 48. The wide spread attachment is driven by the sprocket wheels 49 and 50 over which is trained the sprocket chain 51. The main beater 52 is driven by a sprocket gearing 53 connected with the shaft 11 upon which the driven sprocket 12 is secured.

The sprocket chain 14 and the strut 15 are guided in their movements to and from the sprocket chain 14 by a diagonally arranged member 54 which is rigidly secured to the wall 47 of the spreader body. A clip 55 is secured to the strut 15 with its mid-portion spaced therefrom and arranged on the inside of the member 54 so as to form a guideway and means for preventing the strut from moving laterally out of its operative position and striking the wheel 45.

Although the invention has been described with relation to a particular mechanism, it is to be understood that it is not necessarily limited thereto, but that the invention is of a scope indicated by the subjoined claims.

What is claimed as new is:

1. Control mechanism for manure spreaders comprising, in combination, a beater driving sprocket, a driven sprocket journaled on a fixed support, a movable idler sprocket, a sprocket chain trained around the driven and idler sprockets and having one of its runs movable into and out of engagement with the driving sprocket, a movable support for the idler sprocket extending from that sprocket toward the driven sprocket, means for pivotally mounting the movable support on an axis above a line joining the axes of the driven and idler sprockets, a bell-crank lever having a gravity actuated arm extending toward the sprocket chain, a gravity actuated toggle locking link connecting the movable support and the lever, and a stop carried by the link for preventing downward movement of said lever and said link past a position wherein those elements act as a toggle mechanism to automatically lock the sprocket chain in driving engagement with the driving sprocket.

2. Beater driving mechanism for manure spreaders comprising, in combination, a beater driving sprocket, a driven sprocket journaled on a fixed support, a movable idler sprocket, a sprocket chain trained around the driven and idler sprockets and having one of its runs movable into and out of engagement with the driving sprocket, a movable support for the idler sprocket extending from that sprocket toward the driven sprocket, means for pivotally mounting the movable support on an axis above a line joining the axes of the driven and idler sprockets, a gravity actuated lever having an arm extending toward the sprocket chain, a gravity actuated toggle locking link connecting the movable support and the lever, and a stop formed integral with the link for preventing downward movement of said lever and said link past a position wherein they act as a toggle to automatically lock the sprocket chain in engagement with the driving sprocket and wherein the axis of the pivotal connection between the lever and the link is slightly below a line joining the juncture of the link and the movable support with the axis about which the lever moves.

3. Control mechanism for manure spreaders comprising, in combination, a beater driving sprocket, a driven sprocket journaled on a fixed support, a movable idler sprocket, a sprocket chain trained around the driven and idler sprockets and having one of its runs movable into and out of engagement with the driving sprocket, a movable support for the idler sprocket comprising a radius arm having one end pivotally supported at a point adjacent said driven sprocket and its free end carrying said idler sprocket, and means for shifting said radius arm to move the chain to and from the driving sprocket comprising a bell crank pivotally supported adjacent the idler sprocket for movement in a vertical plane, means connected to one arm of the bell crank for turning it through a limited arc, including a toggle forming a dead center lock at one extreme of movement of the bell crank, and a toggle connection between the other arm of the bell crank and the radius arm, said toggle forming a dead center lock at the opposite extreme of movement of the bell crank.

In testimony whereof I affix my signature.

ERNEST C. SMITH.